United States Patent Office 2,760,851
Patented Aug. 28, 1956

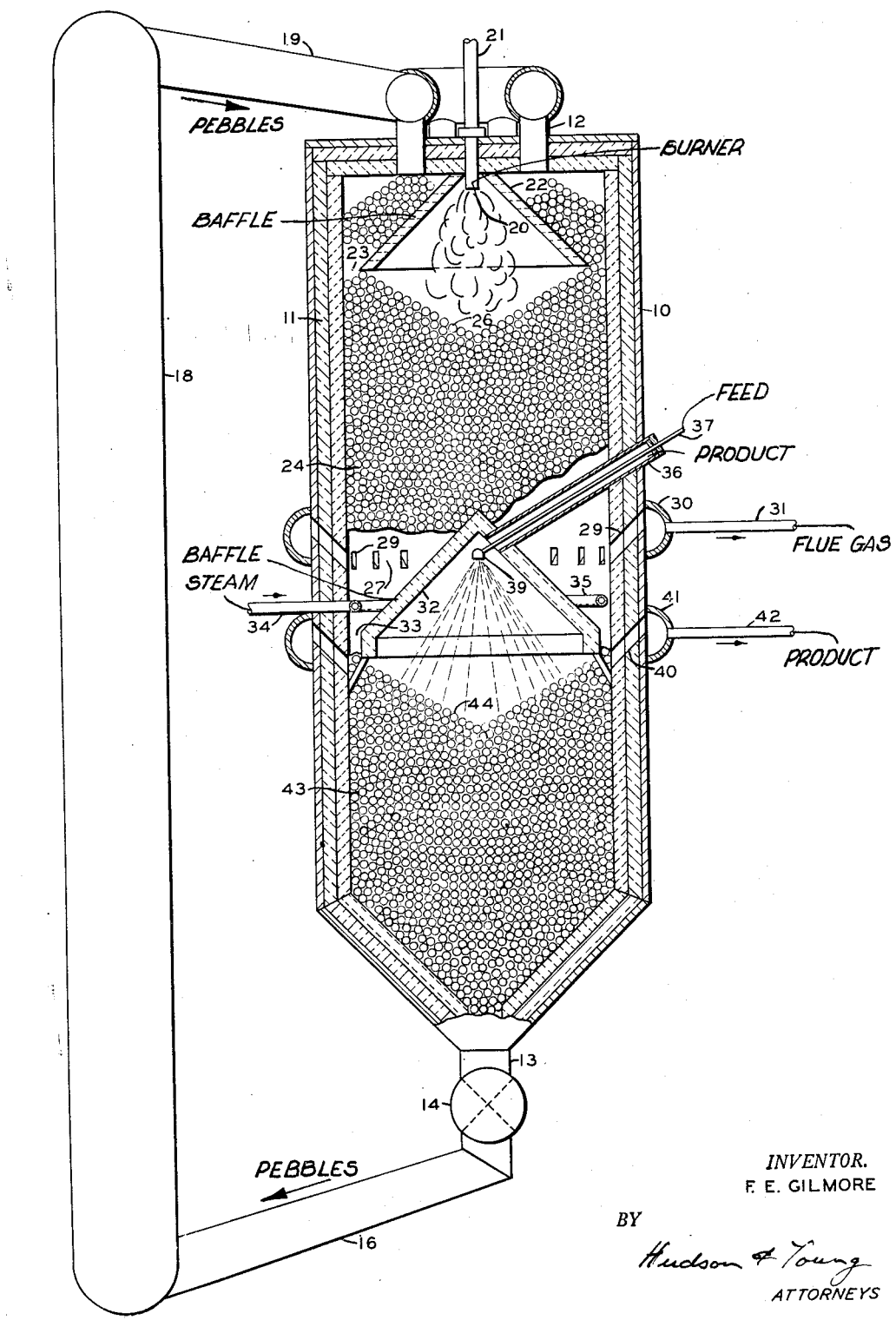

2,760,851

HYDROCARBON CRACKING APPARATUS

Forrest E. Gilmore, Bartlesville, Okla., assignor to Phillips Petroleum Company, a corporation of Delaware Application September 24, 1951, Serial No. 248,040

6 Claims. (Cl. 23—288)

This invention relates to an apparatus and a process for contacting solid particulate material with a fluid. In one of its more specific aspects this invention relates to an apparatus for controlling the shape of a contact bed in a contact chamber. In another of its more specific aspects this invention relates to the pyrolytic conversion of residual oils. In still another of its more specific aspects this invention relates to a process and apparatus for the utilization of a contiguous moving mass of particulate solids in the thermal treatment of hydrocarbons.

Direct contact between a fluid and a solid has become of great importance in various chemical industries. In the conversion of hydrocarbons particularly, particulate granular solids are contacted with fluids. The particulate solids may be employed either as a catalyst and a heat transfer medium or solely as a heat transfer medium. Whether the particulate solids are used solely as a heat transfer medium or as a catalyst, various problems relating to the contact zone or heat exchange zone arise, such as contact time between the fluid and the particulate solid, the flow of the particulate solid through the contact chamber, the shape of the contact bed, etc. Since the solid particulate material is often allowed to seek its own shape within the contact chamber the shape of the solid particulate contact material is, when a single central inlet conduit is used, usually conical at the top. A conical top surface of the bed of solid particulate materials may be undesirable because a longer contact time is obtained in the center of the bed than at the periphery of the bed. It is much to be desired to provide an apparatus for controlling the shape of the contact bed and for controlling contact time between the fluid and the solid particulate material.

Hydrocarbon residual stocks with which a particular embodiment of this invention is concerned are usually by-product heavy residual or bottoms fraction obtained from a distillation of cracked petroleum or from other refining operations. Usually when any further treatment of these stocks is attempted, such as distillation or cracking or the like, decomposition of a heavy material to carbon occurs, resulting in an excessive accumulation of carbon and necessitating shut down of equipment after a very short operating period. Such short operating periods are uneconomical not only because of shutting down and subsequently starting up, but also with respect to the time and the man power requirements for removing the carbon and in readying the equipment for start-up. Furthermore the cracked products obtained are often of low quality and limited utility.

The use of pebble heater apparatus has been proposed by many workers in the art as providing numerous advantages over other known means for cracking hydrocarbons, particularly for the reason that high cracking temperatures can be provided together with accurately controlled contact times, to provide the desired cracking product in high yield.

A pebble heater system, or pebble heater apparatus, as it is often referred to, usually comprises a series of substantially vertically-extending zones, often in vertical alignment with each other. Usually two such zones are employed and are connected by a relatively narrow interconnecting zone, or throat. The top or upper zone is commonly referred to as the pebble heating chamber, and the lower zone as the reaction or contacting chamber. A combustion zone, or chamber, is positioned adjacent or in close proximity to the lower portion of the heating chamber. Combustion gases from the combustion chamber are passed through the mass of pebbles in the pebble heating chamber. A hot gas source other than a combustion is sometimes employed. A contiguous mass of particulate contact material, often referred to as pebbles, fills the pebble heating zone, the interconnecting zone or throat, and the reaction or contacting zone, and flows downwardly through these zones by gravity. Pebbles are discharged from the bottom of the reaction zone at a controlled rate and are returned by elevating means to the inlet in the upper portion of the pebble heating zone. A contiguous gravitating pebble mass thereby fills the pebble heating zone, the interconnecting zone or throat and the reaction or contacting zone at all times.

The term "pebble" as used throughout the specification denotes any solid refractory material of flowable form and size that can be utilized to carry heat or provide a solid contact surface. Pebbles are preferably substantially spherical and about $\frac{1}{32}$ inch to 1 inch in diameter, the preferred range being about $\frac{1}{4}$ inch to $\frac{1}{2}$ inch. Pebbles preferably are formed of a refractory material which will withstand temperatures at least as high as the highest temperature attained in the pebble heating chamber, and must be capable also of withstanding the temperature changes encountered within the apparatus. Refractory materials such as metal alloys, ceramics, or other satisfactory material may be utilized to form such materials. Silicon carbide, alumina, periclase, beryllia, zirconia, and mullite may be satisfactorily used to form such pebbles or may be used in admixture with each other or with other materials. Pebbles formed of such materials, when properly fired, serve very well at high temperatures. Some pebbles withstand temperatures up to about 3500° F. Pebbles which are used may be either inert or catalytic, as used in any selected process.

Pebble heater apparatus is generally employed in the thermal treatment or conversion of reactant materials, often hydrocarbons. Operation of such a pebble system generally involves circulating a contiguous pebble mass through the pebble heating chamber, interconnecting throat, and reaction chamber. That portion of the pebble mass descending through the heating chamber is heated to a suitable predetermined temperature, above a desired treating or conversion temperature, in heat exchange relation with combustion gas or other hot gases from any desired source. Pebbles are often heated in the heating chamber to temperatures as high as from 2,000 to 3,000° F., and in some cases higher, dependent upon the temperature requirements of the subsequent treating step. The thus heated pebbles passing through the reaction chamber are contacted directly with the material to be treated or converted for a suitable contacting time to effect the desired treatment. The pebble mass having given up heat to the material treated in the treating zone, descends through the bottom of the reaction chamber and is fed to an elevator for further handling, generally for transfer to an inlet at the top of the pebble heating chamber for reheating and recirculation through the system.

In many cases when cracking oil residuum stocks in pebble heater apparatus in accordance with conventional methods, a considerable amount of agglomeration of pebbles with accumulated carbon and carbon-rich by-product takes place after being "on stream" for only a short period with the result that pebble circulation is impaired, and often stopped entirely. This occurs particularly at the higher cracking temperatures required, such temperatures in many instances being as high as from 1,000 to 1,700° F.

In introducing a liquid oil residuum feed into contact with a mass of pebbles, great difficulty is experienced in uniformly contacting all the pebbles in the mass, so that each pebble is coated with an equal amount of oil. Instead, disproportionately large amounts of oil may reach only a relatively small portion of the hot pebble mass, with the result that large quantities of free flowing oil move through that small portion of the pebble mass contacted, while the remaining portion of the pebble mass passes through the system unutilized. Furthermore, considerable coking of the injected oil to form carbonaceous by-product takes place, thus reducing efficiency of the conversion to a level not economically feasible; and agglomeration of pebbles and carbonaceous by-product thus formed, takes place. Such agglomeration of carbonaceous matter and pebbles is, of course, undesirable since the pebble system must then be shut-down for an extended period for removal of the agglomerate and for readying the equipment for "re-start-up." An even pebble flow through the heating and reaction zones is also difficult to obtain.

During cracking operation it is oftentime advantageous to reduce the contact time of the hydrocarbon undergoing cracking to a minimum, and oftentime it is also desirable to quench the cracked product resulting from a cracking operation. By quickly quenching the cracked products an improved yield of the more desirable products can be obtained and at the same time cracking to extinction is reduced. As a result, the amount of carbon deposition is greatly reduced.

My invention, in a board embodiment, is concerned with the utilization of a contiguous moving mass of particulate solids in the treatment of fluids (liquids or gases) under conditions to yield a more even solids flow through the contact chamber and enabling operation thereof for long periods of time.

It is an object of this invention to provide a novel apparatus and process for contacting solids and fluids.

Still another object of this invention is to provide means for controlling the shape of a contact bed of granular material within a contact chamber.

Another object of this invention is to provide an apparatus and process for the thermal treatment of hydrocarbons.

Another object of this invention is to provide a process and apparatus for utilizing a contiguous moving mass of particulate solids in the conversion of residual hydrocarbon stocks to a lighter material.

Another object is to provide a process and apparatus for cracking oil residual stocks in a pebble heater system and for continuously removing from the system carbon and carbon rich materials formed therein as by-products of the cracking.

Various objects and advantages of the present invention will become apparent and suggest themselves to those skilled in the art from the accompanying description and disclosure.

In accordance with my invention I have provided an apparatus and a process for contacting fluids with solid particulate materials in such a manner that the solid particulate material moves through the contacting chamber in a regular and even flow. More specifically in accordance with my invention I maintain within a contact chamber a bed of solid particulate material the upper surface of which is substantially in the shape of an inverted cone. Still more specifically and in accordance with a preferred embodiment of my invention as related to the thermal treatment of hydrocarbons, I have provided an apparatus and a process wherein a heating zone is maintained in the upper portion of a single contact chamber. Shielding this heating zone is an upright substantially conical baffle extending downwardly and outwardly toward the walls of the contact chamber and forming an annular passageway therewith. Intermediate the upper and lower ends of the contact chamber, I have provided a solids-gas disengaging zone. Located below the solids-gas disengaging zone is a second up-right substantially conical baffle which, extending downwardly and outwardly, forms a second annular passageway with the walls of the contact chamber. At appropriate points intermediate the lower and upper ends of said contact chamber I have provided suitable outlets for fluids and also suitable inlets for fluids. In accordance with this preferred embodiment, solid particulate material is removed from the bottom of the contact chamber and transported by suitable elevating means to the upper portion of the contact chamber. In operation, the solid particulate material passes evenly over the baffles down through the contact chamber and is discharged therefrom. The solid particulate material may then be recycled to the top of the contact chamber for reuse.

In the above-indicated preferred embodiment of this invention wherein a combustion zone is maintained in the upper portion of the single contact chamber shielded by a baffle therein, it should be pointed out that the solid particulate material upon being admitted into the upper portion of a contact zone impinges upon this top baffle and is deflected toward the walls of the contact chamber. The solid material then passes through the annular passageway between the conical baffle and the walls of the chamber. As the solid particulate material descends therethrough, a contiguous mass of particulate materials is formed directly beneath the baffle, the top surface of which mass is substantially in the shape of an inverted cone. The slope of the surface of the solid particulate material that is, the angle of repose thereof, is governed by the size and surface conditions of the particulate solids. Advantageously, due to the shape of the surface of this contiguous mass of solids, a maximum surface area is exposed to radiant heat from the combustion zone or heating gas inlet which is preferably located at the apex of the top baffle. At the same time, the baffle serves to shield the walls of the contact chamber from the high temperature within the combustion zone. Furthermore the pebbles are preheated as they descend toward the passage and form a falling curtain of particulate solids which act effectively to shield the walls of the chamber from unduly high temperatures.

As the solid particulate material passes on down through the contact chamber, it passes along a solids-gas disengaging zone and then onto a second up-right conical baffle located therebelow. The solid particulate material then passes through a second annular passageway and forms another contiguous mass of solids, the top surface of which is substantially in the shape of an inverted cone. When employing the apparatus of this invention in the thermal treatment of hydrocarbons, liquid hydrocarbon material is preferably sprayed from within the interior of the second baffle, preferably from about its apex onto the surface of the particulate solids therebelow. Advantageously a maximum surface area is available for contacting the fluids with the particulate solids in view of the fact that the surface of the solids below this second baffle is in the shape of an inverted cone.

For a better understanding of the invention, reference is now made to the accompanying diagrammatic drawing which illustrates a preferred form and apparatus of the invention and which is described and discussed in terms of thermal treating (cracking) of heavy hydrocarbons. It is to be understood, however, that the invention is well applied also to the utilization of a contiguous mass of flowable solids whether employed solely as a heat transfer material or as a catalytic material in the treatment of hydrocarbons. Various modifications of the process and apparatus can be made and still remain within the scope of the invention.

Referring now to the accompanying drawing wherein is illustrated a sectional elevational view of a particular apparatus of the invention, a substantially upright chamber 10 is provided, if desired, with suitable refractory lining material 11, such as firebrick and the like. Located at the top of the chamber are a plurality of solid inlets 12 and at the bottom of the chamber is conduit 13 together with flow control or valve means 14 for the discharge of the solid particulate material from the chamber. From valve means 14, the solids are carried via conduit 16 to elevating means, such as a mechanical or gas lift elevator, 18 wherein they are then transported via conduit 19 to the solid material inlets 12 located at the top of the chamber.

Preferably centrally located within the top of chamber 10 is a heating material inlet, such as burner 20, which is supplied with a suitable fuel, oxygen and/or steam or a stream of preheated gas via conduit 21. Burner 20 is located, as shown, within the confines of conical baffle 22, preferably at about the apex of conical baffle 22 which is disposed in a substantially upright position and the sides of which extend downwardly and outwardly to form an annular passageway indicated at 23 with the walls of the chamber. A contiguous gravitating mass of solid particulate material 24 forms beneath baffle 22. The top surface of this contiguous mass of solid particulate material is indicated at 26 and assumes the shape of an inverted cone the slope of the sides of which is governed by the angle repose of the solid particulate material.

Located intermediate the upper and lower ends of chamber 10 is a gas-solid disengaging zone, such as formed by outlets 29 and ring manifold 30. A plurality of outlets 29 communicate with and preferably extend from this zone through the wall of chamber 10 into manifold 30. The gases recovered in manifold 30 are removed therefrom via conduit 31. Located substantially below the solids-gas disengaging zone is an upright conical baffle 32, the apex of which may project somewhat above outlets 29 as indicated. However, the apex may terminate at or below outlet 29 if desired. The walls of baffle 32 extend downwardly and outwardly and form an annular passageway with the walls of chamber 10 at 33. A steam supply conduit intermediate the bottom of baffle 32 and outlet 29 is indicated at 34. Steam or other suitable gas is admitted into chamber 10 by means of ring sparger 35. Communicating with the outside of chamber 10 and extending through the walls thereof is conduit 36 which leads to the interior of baffle 32. Located within conduit 36 is conduit 37 which extends therethrough and terminates with a spray nozzle 39 within and preferably at the apex of baffle 32. A plurality of gas outlets are indicated at 40 which extend and communicate from the interior of chamber 10 preferably immediately below about the bottom of baffle 32 through the wall of chamber 10 with manifold 41. Gaseous products are recovered from manifold 41 via conduit 42. A contiguous mass of solid particulate material is generally indicated at 43, the top surface 44 of which assumes the shape of an inverted cone, the slope of the sides of which depend upon the angle of respose of the solid particulate material.

In the operation of the preferred embodiment of the invention as illustrated in the accompanying drawing, solid particulate material such as pebbles made of refractory materials enter chamber 10 via conduits 12. As the pebbles enter chamber 10 they flow down and impinge upon baffle 22 from which they are deflected downwardly and outwardly through annular passageway 23. Annular passageway 23, is preferably about 2 to 6 inches wide when pebbles having an average diameter of about ½ inch are employed in the contact apparatus of this invention. Generally annular passageway 23 is preferably between about 4 to 12 times the average diameter of the pebbles in width.

As the pebbles descend through passageway 23 a contiguous mass thereof is built up within chamber 10, the top surface of which assumes the shape of an inverted cone due to the natural rest slope of the pebbles as they enter the contact chamber from annular passageway 23. Burner 20 which is preferably located at the apex of baffle 22 projects flame and combustion gases downwardly upon the surface of and into the bed of the solid particulate material. Because of the shape of the surface of the solid particulate material within chamber 10, a greater surface area of the pebbles is exposed to the radiant heat. At the same time, baffle 22 shields the walls of chamber 10 from the high temperatures. The hot combustion gases from burner 20 pass downwardly in concurrent flow and direct heat exchange relationship with the pebbles and emerge via outlets 29 and manifold 30 into conduit 31. The resulting hot pebbles between about 1000° and 1200° F. or higher gravitate through solids-gas disengaging zone 27. After passing through solids-gas disengaging zone the pebbles impinge upon baffle 32 and are deflected downwardly and outwardly through annular passageway 33. Sealing or stripping steam or gas may be admitted via conduit 34 into the solids-gas disengaging zone.

As the pebbles pass through passageway 33, a contiguous mass 43 of pebbles is built up in the lower section of chamber 10. Similarly as in the case of passage through passageway 23 the pebbles which form mass 43 form a mass which has a top surface in the general shape of an inverted cone as indicated at 44. A heavy hydrocarbon residual stock, such as a stock having a gravity between about 13 and 18° A. P. I. enters conduit 37 and is sprayed upon surface 44 of the hot pebbles. Heat carried by and imparted by these pebbles decompose the high boiling hydrocarbons and cracking occurs. The more volatile hydrocarbons are volatilized and cracked. Vapors pass upwardly in countercurrent flow relationship and in direct contact with the liquid hydrocarbon spray from nozzle 39. The liquid hydrocarbon spray from nozzle 39 quenches these vaporized materials as they pass out of chamber 10 via conduit 36. This quenching of the cracked gases is made easy by the conical shape of the space immediately above surface 44. Surface 44 also provides a maximum surface area for the liquid hydrocarbon spray to contact the hot refractory pebbles. Cracked gases are also recovered via outlets 40, manifold 41 and conduit 42. The less volatile, more refractory hydrocarbons which are not immediately vaporized or cracked upon surface 43, gravitate in concurrent flow and direct heat exchange relationship with the mass of pebbles within 43 and, depending upon time and temperature of the contact within mass 43, are cracked at varying depths therein.

As a result of the cracking, carbon deposition occurs upon the pebbles within mass 43. It is pointed out that due to the shape of the top surfaces of the pebble masses 24 and 43 a more even downflow of the pebbles occurs within chamber 10. The greater depth of the pebble bed along the wall of chamber 10 tends to overcome the wall drag upon the pebbles as they gravitate downwardly within chamber 10 giving a more even pebble downflow.

Passageway 33 should be of sufficient width or clearance to permit downflow of pebbles therethrough without undue plugging or bridging. The minimum width of passageway 33 of course should be greater than the diameter of the pebbles employed. Additionally passageway 33 is preferably kept as narrow as possible to prevent the escape of cracked gases therethrough.

As an added feature of this invention a pressure regulator can be installed between manifolds 30 and 41 actuatable on the pressure differential between these two manifolds. Illustrative as to how pressure regulator may be adapted, the pressure differential between manifolds 30 and 41 can be used to actuate a blower for the air supply of burner 20 or to control a blower which may be used to educt the gases from conduits 31 or 42. It is desirable that the pressure differential between manifolds 30 and 41 be a minimum.

The angles defined by conical baffles 22 and 32 may be between about 60° to 120° respectively. The preferred angle of conical baffle 32 is about 90°.

The pebbles as they leave chamber 10 via conduit 13 and valve 14 contain an amount of carbon deposited thereon. As an important feature of this invention it is contemplated that after the pebbles leave the bottom of chamber 10 and are transferred back to the top of chamber 10 via elevating means 18 they can be used for the production of hydrocarbon synthesis gas i. e. CO and $H_2$. Normally the carbon deposited on the pebbles is burned off in the heating zone within mass 24. If production of synthesis gas is desired, steam may be admitted with the air and fuel mixture via line 21 which is supplied to burners 20 and a synthesis gas comprising carbon monoxide and hydrogen can be recovered via conduit 31.

Advantages of this invention are illustrated by the following example. The reactants and their proportions and other specific ingredients are presented as being typical and should not be construed to limit the invention unduly.

A heavy hydrocarbon oil residue having an A. P. I. gravity of 14.2 is charged via conduit 37 and sprayed onto pebble surface 43 at a rate of about 32 pounds per hour. Pebbles are circulated through the chamber at a rate of about 1,230 pounds per hour about 38.5 pounds of pebbles per pound of oil charged. Pebble feed rates as high as 75 pounds to as low as 25 pounds per pound of feed may be used. Effluent gases and vapors are withdrawn from the reactor space immediately above pebble surface 44 via conduit 36 at a temperature of about 990° F. The pebble surface 44 is at a temperature of between about 1100 to 1230° F.

On the basis of the weight of oil feed, gaseous and liquid cracked products obtained amount to about 88 per cent, the remainder comprising carbon. Of the 88 per cent recovered 12 per cent is recovered as a gaseous product and the remaining portion thereof being recovered as the normally liquid product. The 12 per cent by weight carbon is removed continuously from the system on the surface of the pebbles withdrawn from the cracking zone. No agglomeration of carbonaceous by-products with the pebbles take place. A typical recovered gaseous product has the following compositions:

| Component: | Mol percent |
| --- | --- |
| $H_2$ | 13.1 |
| $CH_4$ | 26.2 |
| $C_2H_4$ | 26.2 |
| $C_2H_6$ | 6.2 |
| $C_3H_6$ | 12.6 |
| $C_3H_8$ | 0.8 |
| $C_4$ (unsaturates) | 4.4 |
| $C_4H_{10}$ | 0.3 |
| $C_5+$ | 10.2 |
| | 100.0 |

The following tabulation and other characteristics further identify the charge stock employed and the liquid cracked product obtained, see Table No. 1 as follows.

TABLE I

*Hydrocarbon feed*

| | | |
| --- | --- | --- |
| IBP | °F | 820 |
| 5% | °F | 912 |
| 10% | °F | 955 |
| 20% | °F | 1011 |
| 30% | °F | 1048 |
| 40% | | Cracking |
| API gravity, degrees | | 14.2 |
| SFS viscosity at 122° F | | 822 |
| Carbon residue (Ramsbottom) | | 6.72 |
| B S & W | | 0.8 |
| Total sulfur, wt. per cent | | 0.59 |

*Liquid cracked product*

| | Percent |
| --- | --- |
| 400° F. E. P.—Gasoline | 5.5 |
| 400–750° F.—Gas oil | 8.3 |
| 750–900° F.—Gas oil | 12.8 |
| +900° F.—Residuum | 51.2 |

All percents are based upon weight percent of feed.

As will be evident to those skilled in the art, various modifications can be made or found in the light of the foregoing disclosure and discussion without departing from the spirit or scope of the invention.

I claim:

1. An apparatus for contacting particulate solid material with a fluid comprising a closed upright chamber having solid material inlet means in the top thereof and solid material outlet means in the bottom thereof; a first substantially conical imperforate baffle substantially centrally located within the upper section of said chamber and extending downwardly and outwardly to form a first pebble passageway about and between its periphery and the walls of said chamber; a burner located at the apex of said first baffle and positioned so as to project a flame onto the surface of particulate solid material below said first conical baffle; a second substantially conical imperforate baffle substantially centrally located within said chamber, disposed intermediate said first baffle and said solid material outlet means and extending downwardly and outwardly to form a second pebble passageway about and between its periphery and the walls of said chamber; a first conduit extending through the wall of said chamber and communicating with the interior of said second baffle; a second conduit located within said first conduit and terminating within said second baffle at about its apex; a spray nozzle attached to the end of said second conduit within said second baffle, said nozzle being adapted to spray reactant material onto particulate solid material below said second baffle; a first gaseous material outlet means located intermediate said first and second pebble passageways; and a second gaseous material outlet means located intermediate said second passageway and said solid material outlet means.

2. An apparatus in accordance with claim 1 wherein the width of said first passageway is between about 4 and 12 times the average diameter of said solid material and the width of said second passageway is sufficient to permit free flow of solid material therethrough while preventing the escape of gases therethrough.

3. An apparatus in accordance with claim 1 wherein a gas introduction means is disposed intermediate said first gaseous material outlet means and said second passageway.

4. An apparatus in accordance with claim 1 wherein means for elevating solid material connects said solid material outlet means to said solid material inlet means.

5. An apparatus for contacting particulate solid material with a fluid comprising a closed upright chamber having solid material inlet means in the top thereof and solid material outlet means in the bottom thereof; a first substantially conical imperforate baffle substantially centrally located within the upper section of said chamber and extending downwardly and outwardly to form a first pebble passageway about and between its periphery and the walls of said chamber; heating means located at the apex of said first baffle, said heating means being positioned so as to project a flame onto the surface of particulate solid material below said first conical baffle; a second substantially conical imperforate baffle substantially centrally located within said chamber, disposed intermediate said first baffle and said solid material outlet means and extending downwardly and outwardly to form a second pebble passageway about and between its periphery and the walls of said chamber; reactant material inlet means extending through the wall of said chamber and communicating with the interior of said second baffle, said inlet means being adapted to spray reactant material onto particulate solid material below said second baffle; a first gaseous material outlet means located intermediate said first and second passageways; and second gaseous material outlet means located intermediate said second passageway and said solid material outlet means.

6. An apparatus in accordance with claim 5 wherein means for elevating solid material connects said solid material outlet means to said solid material inlet means.

References Cited in the file of this patent

UNITED STATES PATENTS

| | | |
|---|---|---|
| 2,183,301 | Bossner et al. | Dec. 12, 1939 |
| 2,434,202 | Evans et al. | Jan. 6, 1948 |
| 2,492,999 | Lassiat | Jan. 3, 1950 |
| 2,513,294 | Eastwood et al. | July 4, 1950 |
| 2,530,274 | Weber | Nov. 14, 1950 |
| 2,532,613 | Dutcher | Dec. 5, 1950 |
| 2,534,625 | Robinson | Dec. 19, 1950 |
| 2,541,548 | Robinson | Feb. 13, 1951 |
| 2,558,769 | McKinney | July 3, 1951 |
| 2,559,957 | Hepp et al. | July 10, 1951 |
| 2,593,495 | Shimp | Apr. 22, 1952 |
| 2,614,968 | Simms | Oct. 21, 1952 |
| 2,627,497 | Robinson | Feb. 3, 1953 |
| 2,635,864 | Goins | Apr. 21, 1953 |